Dec. 1, 1931.  W. H. T. HOLDEN  1,833,968
AMPLIFYING SYSTEM
Filed Nov. 19, 1925
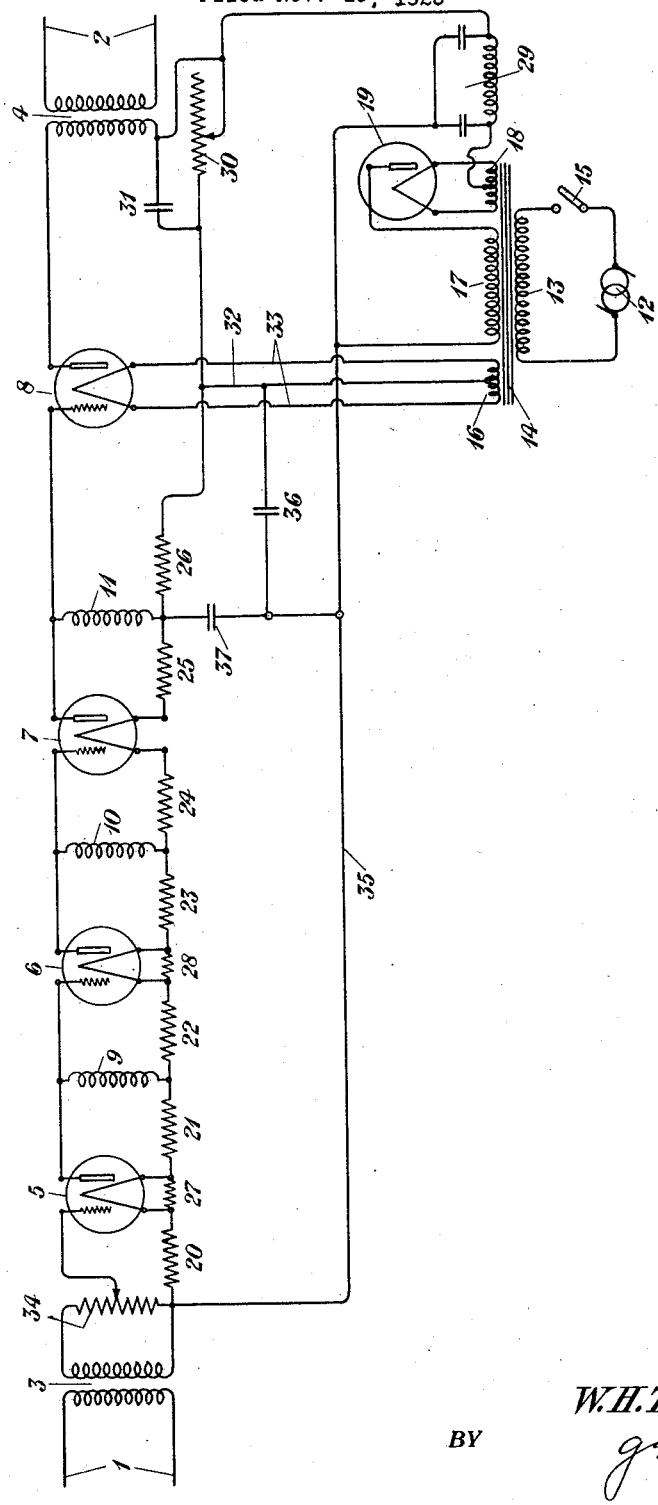
INVENTOR
W.H.T.Holden
BY
ATTORNEY Patented Dec. 1, 1931

1,833,968

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

AMPLIFYING SYSTEM

Application filed November 19, 1925. Serial No. 70,157.

This invention relates to amplifying systems, and more particularly to arrangements in such systems including a plurality of vacuum tubes interconnecting an incoming circuit and an outgoing circuit so that the circuits associated with said vacuum tubes are energized by a source of alternating current.

It has been the practice to connect a plurality of vacuum tubes in tandem with respect to each other for amplifying a band of frequencies in such a way that a plurality of batteries known as "A", "B" and "C" batteries were associated with the circuits of the vacuum tubes for their energization, the "A" battery or batteries being employed for bringing the cathodes of the vacuum tubes to the proper state of incandescence, the "B" battery or batteries being employed for bringing the plates of the vacuum tubes to suitable potentials with respect to said cathodes, and the "C" battery or batteries being employed for providing the necessary bias for the grids of said vacuum tubes. Where two or more tubes were operated at the same plate potentials, a single "B" battery was connected to these plates through a lead common to said plates. The presence of the impedance of this lead and of the "B" battery common to the plate circuits of the several tubes tended to give rise to the phenomenon known as "singing", which generally interferred with the faithful reproduction of signals.

It is therefore an object of this invention to provide arrangements for eliminating the use of the "A", "B" and "C" batteries for establishing the necessary operating characteristics for a plurality of vacuum tubes, and to provide instead arrangements suitable for connecting a source of alternating current to the vacuum tubes for accomplishing the same ends.

It is another object of this invention to connect a plurality of resistances in series relationship with a source of electromotive force, one resistance being included in the input circuit and another resistance being included in the output circuit of each vacuum tube, so that the drop in potential across each resistance will be of the proper magnitude to energize the associated circuit.

It is another object of this invention to provide arrangements for rectifying a source of alternating current in such a way that the rectified current may be employed for setting up a difference in potential across each of a plurality of resistances which are associated with a plurality of vacuum tubes so that the differences in potential of the resistances will be suitable for properly operating the vacuum tubes.

One of the features of this invention is the provision of means for rectifying alternating currents and for passing the rectified current through a series circuit, including the output circuit and filament of a vacuum tube, and a resistance which is associated with the input circuit of the vacuum tube, so that the drop in potential across the resistance is of a magnitude sufficient to bring the grid at a suitable negative potential with respect to the filament of the vacuum tube.

While the nature of the invention will be pointed out with particularity in the appended claims, the invention, itself, both as to its objects and features, will be better understood from the description hereinafter following when read in connection with the accompanying drawing showing one embodiment of the invention.

Referring to the drawing, there is shown an amplifying system having an incoming circuit connected to the leads 1, and an outgoing circuit connected to the leads 2. Transformers 3 and 4 are employed for interconnecting the incoming circuit connected to leads 1 and the outgoing circuit connected to leads 2 of the system by means of a plurality of vacuum tubes so arranged as to amplify a band of frequencies. Vacuum tubes 5, 6, 7 and 8 are connected in tandem with respect to each other between the transformers 3 and 4, and these vacuum tubes are inductively coupled by inductances 9, 10 and 11. It will be understood that these vacuum tubes may be coupled by resistances, by transformers, or by any other means well known in the art. A potentiometer 34 is associated with the input circuit of the vacuum tube 5 for regulating the input voltage from transformer 3 to the grid of the vacuum tube 5, thereby controlling the gain of the amplifier.

A source of alternating current, preferably a 110 volt 60 cycle house lighting circuit, is designated by the reference character 12, and this source of alternating current is connected with the primary winding 13 of a transformer 14 by closing a switch 15. The secondary of the transformer 14 comprises three windings 16, 17 and 18, winding 16 and 18 being low voltage windings, and windings 17 being a high voltage winding. The reference character 19 represents a rectifier which is of the electron type having an anode and a cathode, but it will be understood that any other rectifier well known in the art may be employed instead thereof.

The winding 16 of the transformer 14 is used to heat the cathode of the vacuum tube 8, and the winding 18 is used for heating the cathode of the rectifier 19. Thus the last stage of amplification in the amplifying system is supplied with alternating current for furnishing the energy for the cathode of the vacuum tube thereof. It will be understood that it is one of the features of this invention to heat the cathodes of the tubes of the last stages of amplification in an amplifying system by alternating current, because by confining the use of alternating current to the cathodes of the last stages of amplification, the noise produced in the ampifier output due to the use of alternating current to heat the cathodes is practically negligible.

A plurality of resistances are connected in series relationship with each other, one in the input circuit and another in the output circuit of each vacuum tube employed in the amplifying system. Thus the resistance 20 is associated with the input circuit and resistance 21 is associated with the output circuit of the vacuum tube 5. Resistance 22 is associated with the input circuit and resistance 23 is associated with the output circuit of the vacuum tube 6. The resistance 24 is associated with the input circuit, and the resistance 25 is associated with the output circuit of the vacuum tube 7, and the resistance 26 is associated with the input circuit of the vacuum tube 8. Resistances may or may not be connected in shunt with the cathodes of the vacuum tubes, such resistances being employed only in cases in which too much current would otherwise flow therethrough. If, by virtue of the size, the diameter and the material employed for the cathode, it would receive too much current, resistances may be arranged to shunt such cathodes, as shown in this case by the reference characters 27 and 28.

A filter 29, preferably a low pass filter, is connected with the rectifier 19 for rendering the series circuit connected to the rectifier as free from alternating current components as possible. This filter 29 includes an inductance and a pair of condensers. A rheostat 30 is also included in the series circuit connected to the rectifier 19 for regulating the rate of flow of current from the rectifier 19 through the resistances 20 to 28 and filaments 5 to 7 inclusive. The output circuit of the vacuum tube 8 includes the anode and the cathode of the vacuum tube 8, the primary winding of the transformer 4, a condenser 31, the conductor 32 connected to the midpoint of the low voltage secondary winding 16, and the outer conductors 33 connected to the terminals of the low voltage secondary winding 16.

The terminals of the secondary winding 17 set up a high potential alternating current which is rectified and then employed for energizing the resistances 20 to 28 inclusive. During one-half of the cycle, the right-hand terminal of the winding 17 becomes positive, and the left-hand terminal becomes negative. Thus, a positive potential is impressed on the anode of the rectifier 19 so that rectification may take place. The current then flows through the leads connected to the outer terminals of the secondary winding 18 to the midpoint of said winding and then through the inductance of the filter 29 to the regulating arm of the rheostat 30. There are in series with the resistance of the rheostat, the resistances 26 and 25, the cathode of the vacuum tube 7, resistances 24 and 23, the resistance 28 which shunts the cathode of the vacuum tube 6, the resistances 22 and 21, the resistance 27 which shunts the cathode of the vacuum tube 5, and the resistance 20. From the left-hand terminal of the resistance 20, the circuit to the left-hand terminal of the secondary winding 17 is completed by the connection of conductor 35. In shunt with the resistance of the rheostat 30 is the output circuit of the vacuum tube 8 which includes the primary winding of the transformer 4, the anode and cathode of the vacuum tube 8, the outer leads 33 of the secondary winding 16 and the inner lead 32 connected to the midpoint of the secondary winding 16. Thus the current flowing through the resistances 20 to 28, inclusive, is the sum of the currents flowing through the resistance of the rheostat 30 and through the output circuit of the vacuum tube 8. The condenser 31 is also connected in the output circuit of the vacuum tube 8 for by-passing alternating currents.

The cut-off frequency of the filter 29 is lower than the frequency of the source of alternating current 12 and may be, for example, 30 cycles. Since no frequency present in the 60 cycle source or produced therefrom by the action of the rectifier 19 is below the cut-off frequency of the filter 29, the series circuit connected between the rectifier 19 and the resistances 20 to 28 will be substantially free from alternating current components.

The resistances 20 to 28, inclusive, are of such magnitudes that the difference in potential across each of said resistances is sufficient for providing the proper potential for its associated circuit. Thus the drops in potential across the terminals of the resistances 20 and 21 are sufficient to supply proper voltages to the grid and plate circuits, respectively, of the vacuum tube 5, the drops in potential across the terminals of the resistances 22 and 23 are sufficient to supply proper voltages to the grid and plate circuits, respectively, of the vacuum tube 6, the drops in potential across the terminals of resistances 24 and 25 are sufficient to supply the proper voltages to the grid and plate circuits of the vacuum tube 7, and the drop in potential across the terminals of the resistance 26 is sufficient to supply the proper voltage to the grid circuit of the vacuum tube 8. The resistances 27 and 28 are of magnitudes sufficient to divert enough of the current from the cathodes of vacuum tubes 5 and 6, respectively, so that said cathodes may be brought to the proper state of incandescence.

It is within the scope of this invention to relate a plurality of resistances to a plurality of vacuum tubes, some of the resistances being associated with the input circuits, and other of the resistances being associated with the output circuits of the vacuum tubes, all being in series relationship with each other with respect to a source of rectified current, so that the circuits of the vacuum tubes will be properly energized thereby.

While the invention has been disclosed in a particular embodiment, which is deemed desirable, it is to be understood that it is capable of embodiment in other and widely varied organizations without departing from the spirit of the invention and the scope of the appended claims.

What is claimed is:

1. An amplifier comprising a plurality of three-electrode vacuum tubes each having an input circuit and an output circuit, a source of alternating current, a rectifier, and a plurality of resistances arranged in pairs between the filaments of said vacuum tubes and in series relationship with said filaments and said rectifier, the drop in potential across said resistances being utilized to supply the operating potentials for the input and output circuits of said vacuum tubes.

2. An amplifier comprising a plurality of vacuum tubes each having an anode, a cathode, and a control electrode, each tube having an input circuit including the cathode and the control electrode and an output circuit including the cathode and the anode, a source of alternating current, a rectifier, and a plurality of resistances arranged in series relationship with the cathodes of said vacuum tubes, two resistances being apportioned for each vacuum tube, the two resistances apportioned for any one vacuum tube being different from those apportioned for any of the other vacuum tubes, one of each pair of said resistances being included in the input circuit and the other in the output circuit of each vacuum tube, each resistance being of such magnitude that the drop in potential across the terminals thereof will be sufficient to energize the circuit associated therewith.

3. In an amplifier, a source of alternating current, a rectifier, a plurality of three-electrode vacuum tubes in series relationship with each other, a plurality of resistances, two resistances being associated with each vacuum tube, one being arranged in the input circuit and the other arranged in the output circuit thereof, some of the filaments of the vacuum tubes being heated by unrectified alternating current, and some of the filaments being heated by rectified alternating current, the filaments heated by rectified alternating current being arranged in series relationship with said resistances and said rectifier, the drop in potential across said resistances being adjustable so as to bring the proper potential to the circuits associated therewith.

4. A system for amplifying alternating currents comprising a plurality of three-electrode vacuum tubes, a plurality of resistances, each vacuum tube having an input circuit including one of said resistances and an output circuit including another of said resistances, the two resistances associated with any one of the vacuum tubes being different from those associated with any of the other vacuum tubes, a source of potential, and means for sending current from said source of potential through said resistances, the drop in potential across each of said resistances being of a magnitude suitable to be supplied to the circuit associated therewith.

5. In combination, an incoming circuit, an outgoing circuit, means interconnecting said incoming and outgoing circuits comprising a plurality of three-electrode vacuum tubes arranged in tandem with respect to each other, the anode of one vacuum tube being directly connected to the control electrode of the succeeding vacuum tube, a plurality of choke coils each in common with the output circuit of one vacuum tube and the input circuit of the succeeding vacuum tube, a plurality of resistances, one resistance being associated with the input circuit of a vacuum tube and another resistance being associated with the output circuit thereof, and a source of potential, all of said resistances being in series relationship with said source of potential, each of said circuits being supplied with the necessary potential by virtue of the difference in potential existing between the terminals of the resistances associated therewith when current flows therethrough.

6. In combination, a plurality of three-electrode discharge tubes, a plurality of resistances, one of said resistances being arranged in the input circuit of each of said discharge tubes and another of said resistances being arranged in the output circuit of each of said discharge tubes, the two resistances associated, respectively, with the input and output circuits of any one of the discharge tubes being distinct from those resistances associated with any of the other discharge tubes, and a source of potential arranged in series relationship with said resistances, said circuits being supplied with suitable potentials by virtue of the drops in potential due to said resistances, said discharge tubes being at different potentials with respect to one terminal of said source of potential.

7. The method of operating a plurality of vacuum tubes having a plurality of resistances associated therewith, one resistance being in the input circuit and another resistance being in the output circuit of each vacuum tube, the two resistances associated with any one of the vacuum tubes being different from those associated with any of the other vacuum tubes, which consists in transmitting a direct current through said resistances so that the drop in potential across the terminals of each of said resistances will be sufficient to energize the associated circuit.

In testimony whereof, I have signed my name to this specification this 18th day of November, 1925.

WILLIAM H. T. HOLDEN.